(12) United States Patent
Mitsuno

(10) Patent No.: US 7,205,358 B2
(45) Date of Patent: Apr. 17, 2007

(54) METHOD FOR PRODUCING A EXTRUDED ETHYLENE COPOLYMER

(75) Inventor: Tadahiro Mitsuno, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 357 days.

(21) Appl. No.: 10/419,267

(22) Filed: Apr. 21, 2003

(65) Prior Publication Data
US 2004/0021248 A1 Feb. 5, 2004

(30) Foreign Application Priority Data
Apr. 24, 2002 (JP) .............................. 2002-122048

(51) Int. Cl.
*C08F 8/00* (2006.01)
(52) U.S. Cl. .................. 525/191; 525/240; 264/176.1; 264/331.17
(58) Field of Classification Search ..................... None
See application file for complete search history.

(56) References Cited

U.S. PATENT DOCUMENTS

| 5,419,934 | A | * | 5/1995 | Wilson ....................... 428/34.9 |
| 5,552,104 | A | * | 9/1996 | DeNicola et al. ........... 264/456 |
| 5,663,210 | A | * | 9/1997 | Sugimoto et al. ............. 521/81 |
| 6,329,465 | B1 | * | 12/2001 | Takahashi et al. .......... 525/191 |
| 2003/0114579 | A1 | * | 6/2003 | Mori et al. .................. 524/515 |
| 2004/0210004 | A1 | * | 10/2004 | Takahashi et al. .......... 525/240 |

FOREIGN PATENT DOCUMENTS

| EP | 1 162 211 A1 | 12/2001 |
| JP | 9-328520 A | 12/1997 |

\* cited by examiner

*Primary Examiner*—Mark Eashoo
(74) *Attorney, Agent, or Firm*—Fitch, Even, Tabin & Flannery

(57) ABSTRACT

The object of the present invention to provide a method for producing a extruded ethylene copolymer that can provide a film having excellent melt tension and fluidity as well as excellent impact strength and appearance (haze and transmittance). This object is achieved by a method for producing a extruded ethylene copolymer, comprising extruding an ethylene copolymer of ethylene and an α-olefin having 4 to 20 carbon atoms under specific conditions, and obtaining the extrudate.

6 Claims, 1 Drawing Sheet

Assembly Chart of the Screw Segments

TYPE - A

TYPE - B kneading: L(forward) / R(reverse) / N(neutral)

METHOD FOR PRODUCING A EXTRUDED ETHYLENE COPOLYMER

FIELD OF THE INVENTION

The present invention relates to a method for producing a extruded ethylene copolymer, a extruded ethylene copolymer produced by the method, and a molded article including film that comprises the extruded ethylene copolymer. More particularly, the present invention relates to a method for producing a extruded ethylene copolymer that can provide a film having excellent melt tension and fluidity as well as excellent impact strength and appearance (haze and transmittance) and a molded article including film that comprises the extruded ethylene copolymer.

BACKGROUND OF THE PRESENT INVENTION

Ethylene copolymers are used for various applications by melt processing with various methods. The ethylene copolymers are usually required to have high melt tension suitable for melt molding. For example, for securing the stability of blown tubes during blown film extrusion process, for preventing sagging and tearing and for getting a uniform thickness distribution during blow molding process, and for preventing the decreases of film width (neck in) of molten resin during cast film process and extrusion-coating process, ethylene copolymers having high melt tension are required.

For producing ethylene polymers having high melt tension and excellent processability, for example, Japanese Patent Application No. 09-328520A describes an ethylene copolymer of which density and melt flow rate (MFR) are from 0.880 to 0.980 g/cm$^3$ and from 0.01 to 100 g/10 min. respectively, of which melt tension and MFR satisfy a specific relationship, of which fluidity index and MFR satisfy a specific relationship, and of which swell ratio is higher than 1.40. And also it describes a specific method for extruding the ethylene copolymer, a method for producing granulated pellets by using a conical tapered twin screw extruding machine manufactured by HAAKE and melt extruding at 180° C.

However, further improvement has been desired for the transparency of the molded articles such as films made of the ethylene copolymer described in the above publication.

SUMMARY OF THE INVENTION

It is an object of the present invention to provide a method for producing a extruded ethylene copolymer that can provide a film having excellent melt tension and fluidity as well as excellent-impact strength and appearance (haze and transmittance), a extruded ethylene copolymer produced by the producing method, and a molded article including a film comprising the extruded ethylene copolymer.

The present inventors have conducted extensive studies so that the above problems can be solved by the present invention and completed the present invention.

That is, the present invention is to provide a method for producing a extruded ethylene copolymer, comprising extruding an ethylene copolymer of ethylene and an α-olefin having 4 to 20 carbon atoms under conditions satisfying the following condition 4, and obtaining the extrudate, wherein the ethylene copolymer of ethylene and an α-olefin having 4 to 20 carbon atoms is an ethylene copolymer of which melt flow rate (MFR) and melt tension (MT) satisfy the following conditions 1 to 3 when the ethylene copolymer is kneqded by using twin roll mill:

Condition 1
Melt flow rate (MFR, unit: g/10 min.) is from 0.01 to 200;

Condition 2
Melt flow rate (MFR) and melt tension (MT, unit: cN) at 190° C. satisfy the following (1):

$$2 \times MFR^{-0.59} < MT < 20 \times MFR^{-0.59}; \tag{1}$$

Condition 3
Melt flow rate (MFR) and intrinsic viscosity ([η], unit: dl/g) satisfy the following (2):

$$1.02 \times MFR^{-0.094} < [\eta] < 1.50 \times MFR^{-0.156}; \text{ and} \tag{2}$$

Condition 4
The melt flow rate (MFR) of the copolymer and specific energy for producing the extruded ethylene copolymer (W, unit: kw·hr/kg) satisfy the following (3):

$$W \geq 0.178 \times MFR^{-0.024}. \tag{3}$$

Further, the present invention is to provide a extruded ethylene copolymer produced by the above producing method and molded articles including a film comprising the the extruded ethylene copolymer.

DETAILED DESCRIPTION OF THE PRESENT INVENTION

Figure 1:
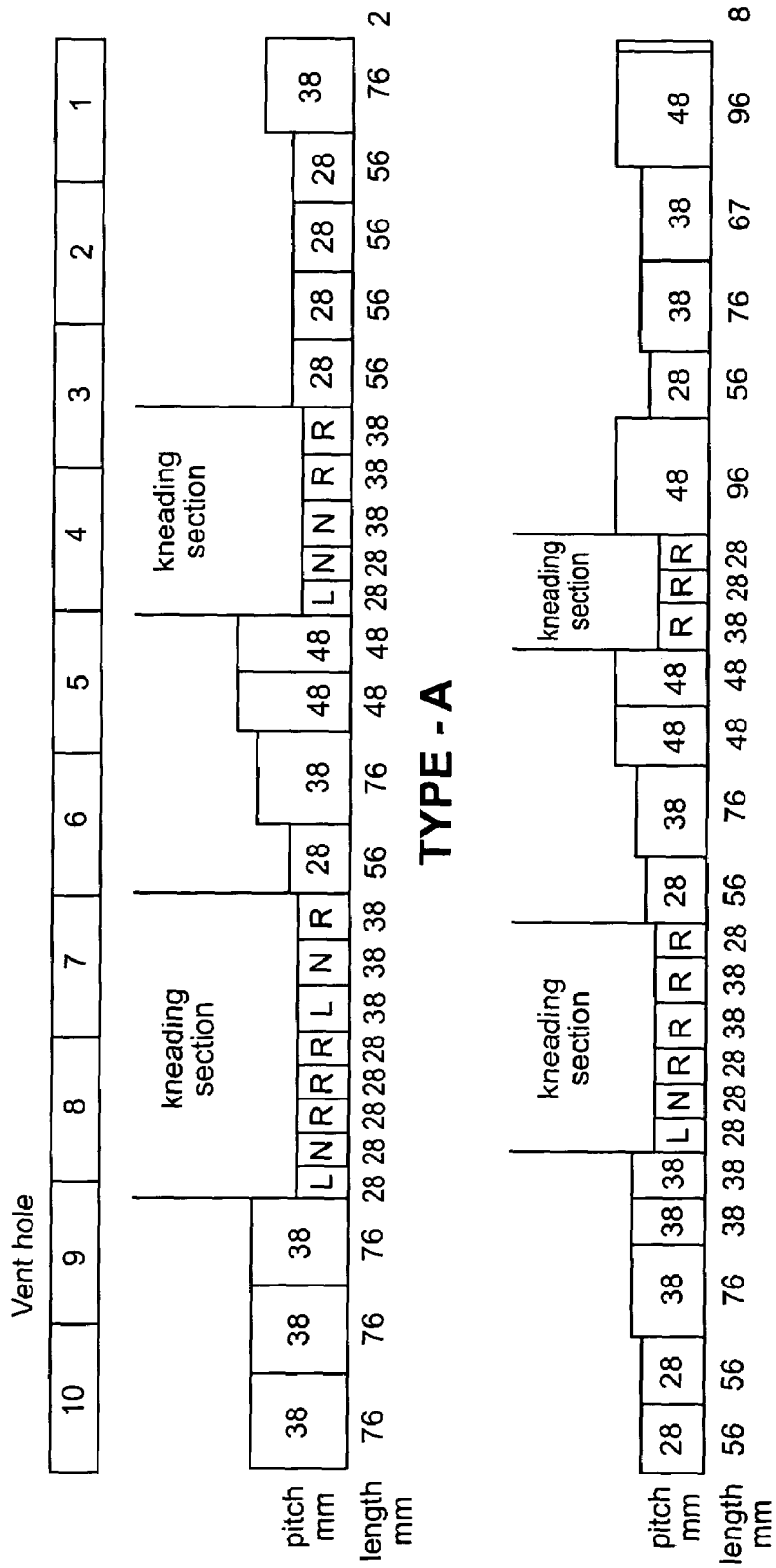
FIG. 1 is an assembly chart of the screw segments of a co-rotating twin-screw extruding machine.

An ethylene copolymer used in the present invention is a copolymer of ethylene and an α-olefin having 4 to 20 carbon atoms.

The α-olefin having 4 to 20 carbon atoms includes, for example, butene-1, pentene-1,4-methyl-1-pentene, hexene-1, octene-1, and decene-1, preferably butene-1, hexene-1, and octene-1, and more preferably hexene-1 and octene-1. These α-olefins may be used solely, or at least two kinds may be used together.

The ethylene copolymer used in the present invention includes, for example, an ethylene-butene-1 copolymer, an ethylene-4-methyl-1-pentene copolymer, an ethylene-hexene-1 copolymer, and an ethylene-octene-1 copolymer, preferably an ethylene-propylene copolymer, an ethylene-butene-1 copolymer, an ethylene-hexene-1 copolymer, and an ethylene-octene-1 copolymer, and more preferably an ethylene-hexene-1 copolymer and an ethylene-octene-1 copolymer. Also, an ethylene-butene-hexene copolymer, an ethylene-butene-octene copolymer, and the like are preferable as a ternary copolymer.

The α-olefin content of the ethylene copolymer used in the present invention is preferably 0.5 to 30 mol%, and more preferably 1.0 to 20 mol %, of the total amount of the ethylene copolymer.

The ethylene copolymer used for producing a extruded ethylene copolymer in the present invention refers to a powdery or solid polymer that is produced from a polymerization reactor, or such a polymer pelletized after extrusion by a cutter. The melt flow rate (MFR) and melt tension (MT) of the ethylene copolymer satisfy conditions 1 through 3, when an antioxidant is properly added to prevent oxidation and crosslinking, and then the mixture is kneaded with twin roll mill at 150° C. for 10 minutes.

The melt flow rate (MFR) of the ethylene copolymer kneaded with twin roll mill used for the present invention is 0.01 to 200 g/10 min. (condition 1), preferably 0.05 to 50 g/10 min., and more preferably 0.1 to 20 g/10 min.

If the melt flow rate (MFR) is less than 0.01 g/10 min, the extrusion load may be excessively high during film processing, resulting in melt fracture. If the melt flow rate (MFR) is more than 200 g/10 min., the mechanical properties of the films may be deteriorated, or the conditions for manufacturing film may be unstable.

The melt flow rate (MFR) of the ethylene copolymer kneaded with twin roll mill used in the present invention and the melt tension (MT) at 190° C. satisfy the following (1) (condition 2):

$$2 \times MFR^{-0.59} < MT < 20 \times MFR^{-0.59}. \quad (1)$$

In general, as the MFR increases, the fluidity increases, that is, the melt viscosity decreases, and the melt tension decreases. The copolymer of ethylene and α-olefin preferably used for the present invention is such copolymer that has long-chain branches, resulting in a higher melt tension in wider range of MFR than that of the conventional linear ethylene-α-olefin copolymers in the same MFR range. Therefore, it has excellent extrusion moldability by satisfying the above conditions 1. If the melt flow rate (MFR) of the ethylene copolymer and the melt tension (MT) at 190° C. do not satisfy $2 \times MFR^{-0.59} < MT$, the manufacturing film cannot be conducted adequately, and, accordingly, the advantages of the ethylene copolymer used for the present invention over the conventional linear ethylene-α-olefin copolymers may be lost. If $MT < 20 \times MFR^{-0.59}$ is not satisfied, films may be tore while being taken in and processed at high speed, and, accordingly, a film may not be manufactured.

The condition 2 is preferably $$2.2 \times MFR^{-0.59} MT < 15 \times MFR^{-0.59},$$

and more preferably $$2.5 \times MFR^{-0.59} < MT < 10 \times MFR^{-0.59}.$$

Additionally, in general, as the MFR increases, the fluidity improves, that is, the melt viscosity decreases, and the intrinsic viscosity decreases. The copolymer of ethylene and α-olefin preferably used for the present invention also is such copolymer that has long-chain branches, resulting in a lower intrinsic viscosity than that of the conventional linear ethylene-α-olefin copolymers in the same MFR range. The melt flow rate (MFR) and intrinsic viscosity ([η]) of the ethylene copolymer kneaded by twin-roll mill used in the present invention satisfy the following (2) (condition 3);

$$1.02 \times MFR^{-0.094} < [\eta] < 1.50 \times MFR^{-0.156}. \quad (2)$$

Thus, it has a low extrusion torque and excellent extrusion processability.

If the melt flow rate (MFR) and intrinsic viscosity ([η]) of the ethylene copolymer do not satisfy $1.02 \times MFR^{-0.094} < [\eta]$, the mechanical strength of the ethylene copolymer may decrease. If $[\eta] < 1.50 \times MFR^{-0.0156}$ is not satisfied, extrusion load during film processing may be excessively high, which is not preferable.

The condition 3 is preferably $$1.05 \times MFR^{-0.094} < [\eta] < 1.47 \times MFR^{-0.156},$$

and more preferably $$1.08 \times MFR^{-0.094} < [\eta] < 1.42 \times MFR^{-0.156}.$$

The density (unit: kg/m³) of the ethylene copolymer used in the present invention is usually 890 to 965 kg/m³, preferably 900 to 950 kg/m³, and more preferably 905 to 935 kg/m³.

The copolymer of ethylene and α-olefin preferably used for the present invention is similarly such copolymer that has long-chain branches, resulting in a higher flow activation energy than the conventional linear ethylene-α-olefin copolymers. While the flow activation energy (Ea, unit: kJ/mol) of the conventional linear ethylene-α-olefin copolymers is 35 kJ/mol or lower, that of the ethylene-α-olefin copolymer preferably used for the present invention is preferably 40 kJ/mol or higher, more preferably 45 kJ/mol or higher, and most preferably 50 kJ/mol or higher.

The above flow activation energy (Ea), which is a rheology index, is calculated from the following Arrhenius equation with the shift factor ($a_T$) when dynamic viscoelasticity data at each temperature T (K) is shifted based on the temperature-time superposition principle, the dynamic viscoelasticity data at each temperature T (K) being measured under the same conditions for calculating the characteristic relaxation time (τ) using a Rheometrics Mechanical Spectrometer RMS-800 manufactured by Rheometrics as a viscoelasticity measuring device: Arrhenius equation for the shift factor ($a_T$)

$$\log(a_T) = Ea/R(1/T - 1/T_0)$$

where R is a gas constant, and $T_0$ is a reference temperature (463K).

Also, the Ea value is determined as the flow activation energy of the copolymer of ethylene and α-olefin of the present invention on the condition that the correlation coefficient r2, which is obtained from linear approximation in the Arrhenius plot of $\log(a_T) - (1/T)$ by using Rhios V.4.4.4 designed by Rheometrics as calculation software, is 0.99 or higher.

In the ethylene copolymer used in the present invention, the preferable range of the molecular weight distribution (weight average molecular weight/number average molecular weight) measured by the GPC method is 3.5 to 20, and more preferable range is 5 to 15.

An example of the method for producing the ethylene copolymer according to the present invention includes a method of copolymerizing ethylene and α-olefin in the presence of hydrogen, using the following metallocene olefin polymerization catalyst.

The metallocene olefin polymerization catalyst used in the manufacture of the ethylene copolymer is obtained by contacting a support of co-catalyst (A), a crosslinked bisindenylzirconium complex (B) and an organic aluminium compound (C), and the support of co-catalyst (A) is obtained by contacting diethylzinc (a), phenol fluoride (b), water (c), silica (d), and trimethyldisilazane $(((CH_3)_3Si)_2NH)$ (e).

The amount of each of the above compounds (a), (b), and (c) is not specifically limited, however, it is preferable that when the molar ratio of the compounds is (a):(b):(c)=1:y:z, y and z satisfy the following (4):

$$|2-y-2z| \leq 1. \quad (4)$$

The number of y in the above (4) is preferably from 0.01 to 1.99, more preferably from 0.10 to 1.80, still more preferably from 0.20 to 1.50, and most preferably from 0.30 to 1.00.

Since the preferable amount of zinc atoms that is contained in the particles obtained by contacting (a) with (d) and is derived from (a) is such that the mole number of the zinc atoms contained in 1 g of the obtained particles is 0.1 mmol or more, the amount of (d) used to (a) should properly be determined to satisfy the above range. The more preferably amount of zinc atoms is from 0.5 to 20 mmol. The amount of (e) used to (d) is preferably 0.1 mmol or more per 1 g of (d) and more preferably from 0.5 to 20 mmol.

The crosslinked bisindenylzirconium complex (B) includes preferably racemate-ethylenebis(1-indenyl) zirconium dichloride and racemate-ethylenebis(1-indenyl) zirconium diphenoxide.

The organic aluminium compound (C) includes preferably triisobutylaluminium and trinormal octylaluminium.

The amount of the crosslinked bisindenylzirconium complex (B) is preferably $5 \times 10^{-6}$ to $5 \times 10^{-4}$ Mol per 1 g of the support of co-catalyst (A). For the amount of the organic aluminium compound (C), the ratio of the mole number of aluminium atoms of the organic aluminium compound (C) to the mole number of zirconium atoms of the crosslinked bisindenylzirconium complex (B) (Al/Zr) is preferably 1 to 2,000.

The polymerization method includes preferably polymerization methods involving the formation of ethylene-α-olefin copolymer particles, for example, vapor phase polymerization, slurry polymerization, and bulk polymerization, and more preferably vapor phase polymerization.

The vapor phase polymerization reactor is usually a device having a fluidized bed type reaction vessel and preferably a device having a fluidized bed type reaction vessel with an enlarged portion. Stirring blades may be provided in the reaction vessel.

For the method of feeding to the reaction vessel each component of the metallocene olefin polymerization catalyst used in the manufacture of the ethylene-α-olefin copolymer according to the present invention, the method of feeding each component in the absence of water, using inert gases such as nitrogen and argon, hydrogen, ethylene, and the like, or the method of dissolving or diluting each component in a solvent and feeding the component as a solution or slurry, is usually used. Each component of the catalyst may be fed individually or may be fed by previously contacting optional components in optional order.

Also, it is preferable that prepolymerization is carried out before main polymerization and that a prepolymerized catalyst component is used as a catalyst component or catalyst for main polymerization.

The polymerization temperature is usually lower than the temperature at which the copolymer melts, preferably about 0 to about 150° C., and more preferably about 30 to about 100° C.

For the purpose of adjusting the melt fluidity of the copolymer, hydrogen may be added as a molecular weight adjusting agent. Also, an inert gas may be present in the mixed gas.

In condition 4 that is a condition for extruding the ethylene copolymer used in the present invention, when the ethylene copolymer is roll-kneaded under predetermined conditions, the melt flow rate (MFR) measured after the roll-kneaded and specific energy for extruding ethylene copolymer (W, unit: kw·hr/kg) satisfy the following expression (3):

$$W \geq 0.178 \times MFR^{-0.240}. \tag{3}$$

The preferable range of W is $$W \geq 0.178 \times MFR^{-0.240} + 0.02,$$

and more preferable range is $$W \geq 0.178 \times MFR^{-0.240} + 0.06.$$

The specific energy for extruding (W) in condition 4, which is a condition for extruding the ethylene copolymer used in the present invention, is energy supplied from the extruding device per the unit weight (1 kg) of resin such as the ethylene copolymer, when the resin is melt extruded, and higher values indicate greater kneading effect. For an extruder, for example, the specific energy for extruding is expressed by the power consumption of the screw-driving motor that is required to extrude approximately 1 kg of the resin.

Specifically, the specific energy for extruding is calculated from the following expression (5):

$$W = (3^{1/2} \times (I - I_0) \times E \times \phi)/(1000 \times Q) \tag{5}$$

where I indicates the load current (A) during extruding, $I_0$ indicates the load current (A) during screw racing, E indicates voltage (V), $\phi$ indicates power factor, and Q indicates extruder output (kg/hr).

Relaxation time of resin having a long-chain branch is a significantly longer during melting than linear ethylene copolymers having the same MFR. Therefore, differing from the linear ethylene copolymers, the long-chain branched polymers shows different melt behavior such as MFR, SR, and melt tension depending on the state of entanglement of molecules. Since the ethylene copolymer preferably used in the present invention has long-chain branches, it is presumed that difference in the extruding strength expressed by specific energy for extruding causes difference in the state of entanglement of molecules, thus changing the melt properties.

The melt flow rate and swell ratio of the ethylene copolymer resin after extruding the ethylene copolymer used in the present invention under conditions satisfying the above condition 4 are $MFR_1$ and $SR_1$ respectively.

When the melt flow rate ($MFR_0$) and swell ratio ($SR_0$) of pellets obtained by granulating the material polymer with a single screw extruder, or a molded article, of the present invention, under extrusion conditions satisfying condition 5 are compared with the melt flow rate, $MFR_1$, and swell ratio, $SR_1$, of pellets or a molded article obtained by the producing method of the present invention, $MFR_1/MFR_0 > 1$ and $SR_1/SR_0 < 1$ are preferably satisfied. The range of $MFR_1/MFR_0$ is preferably $5 > MFR_1/MFR_0 > 1$ and more preferably $2 > MFR_1/MFR_0 > 1.01$. If $MFR_1$ does not satisfy $MFR_1/MFR_0 > 1$, the transparency of films may be inadequate. The range of $SR_1/SR_0$ is preferably $0.1 < SR_1/SR_0 < 1$ and more preferably $0.5 < SR_1/SR_0 < 0.99$. If $SR_1$ does not satisfy $SR_1/SR_0 < 1$, the transparency of films may be inadequate.

In condition 5, the melt flow rate (MFR) of the ethylene copolymer and the specific energy for extruding the ethylene copolymer (W, unit, kw·hr/kg) satisfy the following (4);

$$W < 0.178 \times MFR^{-0.240}. \tag{4}$$

The extruding in the method for producing the extruded ethylene copolymer, comprising extruding an ethylene copolymer of ethylene and an α-olefin having 4 to 20 carbon atoms that satisfies the above conditions 1 to 3 according to the present invention, means melt-extruding the ethylene copolymer to pelletize into uniform particles or the like in order to make the ethylene copolymer resin easier to handle during following molding process The extrudate of the ethylene copolymer in the present invention refers to pellets, solid of resin, and the like obtained after extruding the ethylene copolymer with various extruding machines. The extruded ethylene copolymer is the extruded ethylene copolymer under the extruding conditions of the present invention.

The extruding machine used for extruding includes, for example, single screw extruding machines, twin screw extruding machines, Banbury mixers, and the like.

Additives, such as a neutralizing agent, antioxidant, lubricant, antistatic agent, antiblocking agent, weatherproofing agent, defogging agent, and antirust, and polymer compounds other than the ethylene copolymer used in the present invention may be added, as required, to the extruded ethylene copolymer obtained by the producing method of the present invention.

The application of the extruded ethylene copolymer obtained by the producing method of the present invention includes, for example, films, however, similar effects can be obtained in pipes, tubes, fibers, containers, daily goods, caps, large molded articles, and the like.

The method of molding films, pipes, tubes, containers, and fibers includes, for example, extrusion molding. The method of molding containers includes, for example, blow molding. The method of molding daily goods and caps includes, for example, injection molding. The method of molding large molded articles includes, for example, rotational molding.

EXAMPLES

The present invention will be described below in detail based on examples and comparative examples, however, the present invention is not limited to these examples.

(1) Preparation of Samples for Measuring Melt Flow Rate (MFR), Intrinsic Viscosity ([η]), and Melt Tension (MT)

1,000 ppm of BHT and 1,000 ppm of calcium stearate were added to 50 to 100 g of a powdery ethylene copolymer obtained by polymerization. The mixtures were kneaded at 150 (±5)° C. for ten minutes, using an HR-20F type test roll machine manufactured by Nisshin Kagaku Co., Ltd., as twin roll mill with a roll size of 75 φ×200 L mm, roll rotations of 17 rpm for the back roll and 14 rpm for the front roll, a front/back ratio of 1:1.2, twin roll-heating cartridge heaters, each used at 200 V and 1.5 kw, and driving electricity at 200 V and 0.75 kw. The obtained samples were subjected to the measurement of MFR, [η], and melt tension.

(2) Granulation of the Ethylene Copolymer (Extruding Method 1)

Granulation was carried out using a single screw extruding machine with a full flight screw having 40 mmφ and L/D=28 manufactured by TANABE PLASTICS Co., Ltd., at a screw rotation of 80 rpm, at 150° C., and in a nitrogen atmosphere. The motor load (A) and extruding rate of resin (kg/hr) obtained during granulation were used to calculate the specific energy for extruding. In calculation of the specific energy for extruding, the power factor (φ) of the extruding machine was set to 0.85. For measurement of the properties (Brabender torque, tensile impact strength, and the optical properties of films) of samples employing the extruding method 1, the extruded ethylene copolymer resins pelletized by the extruding method 1 were used.

(3) Granulation of the Ethylene Copolymer (Extruding Method 2)

Granulation was carried out using a 35 mmφ co-rotating twin screw extruding machine (TEM-35B) with L/D=32.8 and a barrel diameter of 37 mm manufactured by TOSHIBA MACHINE Co., Ltd., at a screw rotation of 150 rpm, at 150° C., and in a nitrogen atmosphere. The motor load (A) and extruding rate of resin (kg/hr) obtained during granulation were used to calculate the specific energy of extruding. In calculation of the specific energy for extruding, the power factor (φ) of the extruding machine was set to 0.602. For measurement of the properties (Brabender torque, tensile impact strength, and the optical properties of films) of samples employing the extruding method 2, the extruded ethylene copolymer pelletized by the extruding method 2 were used.

(4) Melt Flow Rate (MFR, Unit: g/10 min.)

The melt flow rate was measured according to JISK6760-1981 with a load of 2.16 kg at 190° C.

(5) Swell Ratio (SR)

A strand extruded at the time when the melt flow rate measurement was carried out using a melt flow rate measuring device according to JIS K 6760-1981 with a load of 2.16 kg at 190° C. was cooled to 23° C., and its diameter D was measured. The swell ratio (SR) was obtained by calculating the ratio of the diameter D to the orifice diameter $D_0$ ($D/D_0$)

(6) Intrinsic Viscosity ([η], Unit: dl/g)

A sample solution in which 100 mg of the ethylene copolymer was dissolved at 135° C. in 100 ml of tetralin containing 5% by weight of BHT as a thermal degradation preventing agent was prepared. The relative viscosity (η rel) at 135° C. was calculated from the descending time of the sample solution and a blank solution, using an Ubbelohde viscometer. Then, the intrinsic viscosity [η] was calculated from the following expression (6):

$$[η]=23.3\times\log(η\ rel) \quad (6)$$

(7) Melt Tension (MT, Unit: cN)

Using a melt tension tester manufactured by TOYO SEIKI SEISAKU-SHO, LTD, melted resin was extruded from the orifice with a diameter of 2.09 mmφ and a length of 8 mm by the piston at a descending speed of 5.5 mm/min. at 190° C., and the tension of the melted resin when it was taken up at a take-up speed of 40 rpm/min. was measured.

(8) Tensile Impact Strength (Tensil, Unit: kJ/m)

The tensile impact strength was measured according to ASTM D1822-68.

(9) Brabender Torque (Br-T, Unit: N·m)

Extruding was carried out using a Brabender Plasticorder PLV-151 manufactured by Brabender, with a mixing portion capacity of 60 cc, using 40 g of the resin, at 160° C., and at a rotation of 60 rpm, and the torque after 30 minutes was measured.

(10) Film Processing Method

The blown film of above granulated pellets were processed using a single screw extruder with a full flight type screw having 30 mmφ and L/D=28 manufactured by PLACO CO., LTD., a die with 50 mmφ and a lip gap of 0.8 mm, and a double slit air ring, under the conditions of a processing temperature of 170° C., an extrusion amount of 5.5 kg/hr., a frost line distance (FLD) of 200 mm, and a blow ratio of 1.8. As a result, films having a thickness of 30 μm were obtained.

(11) Haze

The haze was measured according to ASTM D1003. Smaller haze values indicate better transparency.

(12) LSI (Transmittance)

The molded films were adjusted at 23±2° C. and 50±5 % RH for 24 hours or longer. For these films, scattered light at ±0.4° to 1.2° was measured using an LSI tester manufactured by TOYO SEIKI SEISAKU-SHO, LTD and determined as the measure of transmittance. Smaller values indicate better transmittance.

(13) Melt Flow Rate Ratio (MFRR)

The melt flow rate was measured according to JISK 6760-1981. The melt flow rate ratio (MFRR) was obtained by dividing a MFR obtained with a load of 2.16 kg at 190° C. by a MFR obtained with a load of 21.6 kg at 190° C.

(14) Density (d, unit: Kg/m$^3$)

The density was measured according to the A method, JIS K 7112-1980.

Example 1

Preparation of the Support of Co-catalyst (A)

1.50 liters of tetrahydrofuran and 1.350 liters (2-70 mol) of a hexane solution of diethylzinc (2.0 mol/liter) were put into a 5-liter four-neck flask purged with nitrogen, and cooled to 5° C. A solution in which 199 g (1.08 mol) of pentafluorophenol was dissolved in 500 ml of tetrahydrofuran was dropped into the mixture for 60 minutes. After dropping, the mixture was stirred at 5° C. for 60 minutes, then, the temperature of the mixture was raised to 45° C. over 28 minutes, and the mixture was stirred for 60 minutes. Then, the temperature of the mixture was lowered to 20° C. by ice bath, and 45.2 g (2.51 mol) of H$_2$O was dropped into the mixture for 90 minutes. Then, the mixture was stirred at 20° C. for 60 minutes, the temperature of the mixture was raised to 45° C. over 24 minutes, and the mixture was stirred for 60 minutes. Then, the solvent was removed under reduced pressure for 120 minutes while the temperature was raised to 50° C. Then, the residue was dried at 120° C. under reduced pressure for 8 hours. As a result, 434.6 g of a solid product was obtained.

434.6 g of the above solid product and 3 liters of tetrahydrofuran were put into a 5-liter four-neck flask purged with nitrogen, and stirred. 334.3 g of silica that was heated at 300° C. in nitrogen flow (Sylopol 948 manufactured by Davison, with an average particle diameter of 61 μm, a pore volume of 1.61 ml/g, and a specific surface area of 296 m$^2$/g) was put into the mixture. The mixture was heated to 40° C., stirred for 2 hours, and allowed to stand for sedimentation of the solid component, and the upper slurry portion was removed when the interface between the layer of the sedimented solid component and the upper slurry portion appeared. For washing operation, 3 liters of tetrahydrofuran was added to the solid component, followed by stirring, then the mixture was allowed to stand for sedimentation of the solid component, and the upper slurry portion was removed similarly when the interface appeared. This washing operation was repeated for a total of 5 times. Then, the solid component was dried at 120° C. under reduced pressure for 8 hours to obtain 521.2 g of the support of co-catalyst (A).

Prepolymerization 96 liters of butane containing triisobutylaluminium at a concentration of 2.5 mmol/liter and 40 liters of hydrogen at room temperature and under atmospheric pressure were fed to a 210-liter autoclave with a stirrer that was previously purged with nitrogen, and the temperature, of the autoclave was raised to 40° C. Further, ethylene was fed into the autoclave at a gas phase pressure of 0.2 MPa. After the system was stabilized inside, 250 mmol of triisobutylaluminium and 36mmol of racemate-ethylenebis (1-indenyl) zirconium diphenoxide were introduced into the autoclave, followed by 243 g of the above support of co-catalyst (A) to initiate polymerization. 1.2 kg/hour of ethylene and 5.0 liters/hour of hydrogen at room temperature and under atmospheric pressure were fed to the autoclave for the first 1 hour. The polymerization temperature increased from 40° C. to 50° C. over 30 minutes after introduction of the above support of co-catalyst (A). 5.6 kg/hour of ethylene and 14.9 liters/hour of hydrogen at room temperature and under atmospheric pressure were fed to the autoclave after introduction of the component (B), so as to carry out polymerization at 50° C. A total of 4 hours of prepolymerization was thus carried out. After polymerization, the autoclave was purged with ethylene, butane, and a hydrogen gas. Then, the solvent was filtered, and the produced solid was dried in vacuum at room temperature to obtain a prepolymerized catalyst component in which 54.6 g of polyethylene per 1 g of the above support of co-catalyst (A) was prepolymerized. The intrinsic viscosity [η] of the polyethylene was 1.54 dl/g Continuous Vapor Phase Polymerization Copolymerization of ethylene and 1-hexene was carried out in a continuous type fluidized bed vapor phase polymerization device, using the prepolymerized catalyst component obtained above. The polymerization conditions were a temperature of 85, ° C. a total pressure of 2 MPa, and a gas linear velocity of 0.24 m/s. The molar ratio of hydrogen to ethylene was 0.37%, and the molar ratio of 1-hexene to ethylene was 2.0%. Ethylene, 1-hexene, and hydrogen were continuously fed during polymerization to maintain a constant gas composition. 196 g/hr. of the above prepolymerized catalyst component and 28 mol/hr. of triisobutylaluminium were continuously fed to maintain the total powder weight of the fluidized bed at 80 kg, A ethylene/1-hexene copolymer was obtained with an average polymerization time of 4 hr. and a production efficiency of 19 kg/hr.

Granulation of the Ethylene Copolymer

The obtained ethylene copolymer was blended with 1,000 ppm of calcium stearate, 2,000 ppm of Irgnox 1076 (manufactured by CHIBA-GEIGY), and 1,600 ppm of P-EPQ (manufactured by CHIBA-GEIGY), and granulation was carried out by the extruding method 1 as described above to obtain a extruded ethylene copolymer resin satisfying Requirement 4. The obtained pellets were further granulated and extruded under the same conditions for two times, that is, a total of three times, to obtain a extruded ethylene copolymer resin satisfying Requirement 5. The specific energy for extruding used while the extruding was carried out repeatedly was calculated from a specific energy for extruding per one extruding×the number of times of extruding.

Examples 2 to 8

Continuous vapor phase polymerization was carried out under conditions shown in Table 1, and other processes were carried out under the same conditions as in Example 1.

Example 9

A ethylene copolymer was manufactured by the same method as in Example 1, and the obtained copolymer was granulated and extruded for 4 times under the same conditions as in Example 1 to obtain a extruded ethylene copolymer resin. The specific energy for extruding used while the extruding was carried out repeatedly was calculated from a specific energy for extruding per one extruding×the number of times of extruding.

Example 10

A ethylene copolymer was manufactured under the continuous vapor phase polymerization conditions shown in Table 1 and under the same conditions as in Example 1 for other polymerization conditions. The obtained ethylene copolymer was blended with the same type and amount of additives as in Example 1, and granulation was carried out by the extruding method 2 under the conditions of a extruder output of 16 kg/hr. and a minimum clearance of 0.13 mm to obtain a extruded ethylene copolymer resin. Screw segments were assembled as shown by Type-A in FIG. 1.

Example 11

The same ethylene copolymer and additives as in Example 10 were blended, and granulation was carried out by the extruding method 2 under the conditions of extruder output of 8 kg/hr. and a minimum clearance of 0.13 mm. Screw segments were assembled as shown by Type-A in FIG. 1.

Comparative Example 1

The pellets of the high-pressure low-density polyethylene Sumikathene F200 manufactured by SUMITOMO CHEMICAL Co., Ltd. were used, and their properties were measured.

Comparative Example 2

The pellets of the metallocene-catalyzed linear low-density polyethylene Sumikathene E FV205 manufactured by SUMITOMO CHEMICAL Co., Ltd. were used, and their properties were measured.

Comparative Example 3

The same ethylene copolymer and additives as in Example 10 were blended, and granulation was carried out by the extruding method 2 under the conditions of edtruder output of 8 kg/hr. and a minimum clearance of 0.13 mm. Screw segments were assembled as shown by Type-B in FIG. 1.

Comparative Example 4

The same ethylene copolymer and additives as in Example 1 were blended, and granulation was carried out once by the extruding method 1 to obtain a extruded ethylene copolymer resin.

In FIG. 1, the numbers 1 to 10 at the top indicate barrel blocks. Smaller numbers indicate the hopper side, and larger numbers indicate the die outlet side. The "vent hole" indicates a suction hole for deaeration. The "pitch" indicates the pitch of grooves of the screw, and the "length" indicates the length of each segment. The unit of the numerical values is mm. The kneading portion comprises kneading discs, and the "kneading type" indicates the type of kneading of each kneading segment. The kneading discs are arranged in such a manner that, with respect to the dice direction, "L" pushes back resin, "R" feeds the resin forward, and "N" does not induce feeding, and are used to obtain the respective kneading effects.

TABLE 1

| | Polymerization temperature °C. | Total pressure Mpa | Gas linear velocity m/s | [H2]/[C'2] | [C'6]/[C'2] | Prepolymerized catalyst added g/hr | Triisobutylaluminium added mmol/h | Fluidized bed powder amount Kg | Average polymerization Lime hr | Production efficiency kg/h |
|---|---|---|---|---|---|---|---|---|---|---|
| Example 1 | 85 | 2 | 0.24 | 0.37 | 2.0 | 196 | 28 | 80 | 4 | 19 |
| Example 2 | 80 | 2 | 0.34 | 0.22 | 1.5 | 132 | 59 | 80 | 3 | 25 |
| Example 3 | 85 | 2 | 0.28 | 0.20 | 2.2 | 198 | 23 | 100 | 5 | 20 |
| Example 4 | 85 | 2 | 0.31 | 0.28 | 2.2 | 106 | 24 | 80 | 4 | 22 |
| Example 5 | 85 | 2 | 0.31 | 0.28 | 22 | 129 | 27 | 60 | 3 | 21 |
| Example 6 | 85 | 2 | 0.31 | 0.20 | 2.2 | 125 | 26 | 60 | 3 | 24 |
| Example 7 | 85 | 2 | 0.31 | 0.21 | 1.6 | 131 | 25 | 60 | 4 | 17 |
| Example 8 | 71 | 2 | 0.28 | 0.31 | 2.0 | 174 | 26 | 60 | 3 | 18 |
| Example 9 | 85 | 2 | 0.24 | 0.37 | 2.0 | 196 | 28 | 80 | 4 | 19 |
| Example 10 | 80 | 2 | 0.37 | 0.27 | 1.7 | 71 | 25 | 80 | 5 | 16 |

[H2]/[C'2]: mol ratio of hydrogen to ethylene,: mol ratio of 1-hexene to ethylene

TABLE 2

| | MFR. g/10 min | K1 190° C. cN | (1) $2.0 \times MFR^{-0.53}$ | (1) $20 \times NFR^{-0.53}$ | [η] dl/g | (2) $1.02 \times MFR^{-0.034}$ | (2) $1.50 \times HIR^{-0.135}$ | $HER_0$ g/10 min | $SR_6$ | $MFRR_0$ | Extruding method | Granulation ampere 1A | Specific energy for extruding$_0$ kw-hr/kg |
|---|---|---|---|---|---|---|---|---|---|---|---|---|---|
| Example 1 | 1.37 | 2.5 | 1.7 | 16.6 | 1.10 | 0.99 | 1.43 | 1.82 | 1.30 | 72 | 1 | 20.0 | 0.103 |
| Example 2 | 0.66 | 4.0 | 2.6 | 25.6 | 1.40 | 1.06 | 1.60 | 1.21 | 1.37 | 63 | 1 | 22.0 | 0.133 |
| Example 3 | 0.42 | 5.1 | 3.3 | 33.4 | 1.27 | 1.11 | 1.72 | 0.67 | 1.19 | 79 | 1 | 25.0 | 0.177 |
| Example 4 | 4.32 | 1.3 | 0.8 | 8.4 | 1.01 | 0.89 | 1.19 | 4.79 | 1.46 | 45 | 1 | 20.0 | 0.103 |
| Example 5 | 3.17 | 1.7 | 1.0 | 10.1 | 1.04 | 0.92 | 1.25 | 3.96 | 1.44 | 46 | 1 | 20.0 | 0.103 |
| Example 6 | 1.31 | 2.5 | 1.7 | 17.1 | 1.16 | 0.99 | 1.44 | 1.81 | 1.34 | 55 | 1 | 22.0 | 0.133 |

TABLE 2-continued

| | | | | | | | | | | | | | |
|---|---|---|---|---|---|---|---|---|---|---|---|---|---|
| Example 7 | 2.43 | 1.8 | 1.2 | 11.8 | 1.08 | 0.94 | 1.31 | 3.11 | 1.38 | 47 | 1 | 21.5 | 0.125 |
| Example 8 | 1.01 | 3.4 | 2.0 | 19.9 | 1.08 | 1.02 | 1.50 | 1.34 | 1.32 | 76 | 1 | 22.3 | 0.137 |
| Example 9 | 1.37 | 2.5 | 1.7 | 16.6 | 1.10 | 0.99 | 1.43 | 1.82 | 1.30 | 72 | 1 | 20.0 | 0.103 |
| Example 10 | 1.10 | 3.4 | 1.9 | 18.9 | 1.15 | 1.01 | 1.48 | 1.36 | 1.42 | 69 | 2 | 23.5 | 0.072 |
| Example 11 | 1.10 | 3.4 | 1.9 | 18.9 | 1.15 | 1.01 | 1.48 | 1.36 | 1.42 | 69 | 2 | 23.5 | 0.072 |
| Comparative example 1 | 2.06 | 3.3 | 1.3 | 13.1 | 0.91 | 0.95 | 1.34 | | | | | | |
| Comparative example 2 | 1.95 | 0.7 | 1.3 | 13.5 | 1.52 | 0.96 | 1.35 | | | | | | |
| Comparative example 3 | 1.10 | 3.4 | 1.9 | 18.9 | 1.15 | 1.01 | 1.48 | 1.36 | 1.42 | 69 | 2 | 23.5 | 0.072 |
| Comparative example 4 | 1.37 | 3.0 | 1.3 | 16.6 | 1.10 | 0.99 | 1.43 | 1.82 | 1.30 | 72 | 1 | 20.0 | 0.103 |

| | $MFR_1$ | $SR_1$ | $MFRR_1$ | Density | $MFR_1/MFR_0$ | $SR_1/SR_0$ | BR-T 160° C. | Tensil | Processing 170° C. 30 mm φ 30 φ | | Extruding method | Granulation ampere 1A | Specific energy for extruding$_1$ | Reference specific energy |
|---|---|---|---|---|---|---|---|---|---|---|---|---|---|---|
| | g/10 min | | | kg/m³ | $MFR_0$ | $SR_0$ | N-M | KJ/m | HAZL | LSI | | | kw-hr/kg | kw-hr/kg |
| Example 1 | 1.97 | 1.26 | 74 | 920 | 1.08 | 0.97 | 10.0 | 960 | 11.3 | 7.5 | 1 | 20.0 × 3 | 0.309 | 0.165 |
| Example 2 | 1.45 | 1.24 | 62 | 921 | 1.20 | 0.95 | 12.2 | 1540 | 11.4 | — | 1 | 22.0 × 3 | 0.399 | 0.197 |
| Example 3 | 0.73 | 1.16 | 79 | 913 | 1.09 | 0.97 | 14.6 | 1520 | 12.8 | 7.9 | 1 | 18.0 × 3 | 0.531 | 0.219 |
| Example 4 | 4.91 | 1.43 | 46 | 913 | 1.03 | 0.98 | 8.9 | 830 | 8.5 | 14.6 | 1 | 25.0 × 3 | 0.109 | 0.123 |
| Example 5 | 0.10 | 1.48 | 47 | 913 | 1.04 | 0.97 | 9.5 | 1130 | 7.0 | 9.1 | 1 | 20.0 × 3 | 0.309 | 0.135 |
| Example 6 | 2.04 | 1.29 | 54 | 913 | 1.13 | 0.96 | 12.0 | 1320 | 9.2 | 11.7 | 1 | 20.0 × 3 | 0.399 | 0.167 |
| Example 7 | 3.15 | 1.33 | 48 | 921 | 1.08 | 0.96 | 10.1 | 1010 | 8.3 | 5.4 | 1 | 22.0 × 3 | 0.375 | 0.144 |
| Example 8 | 1.39 | 1.29 | 77 | 910 | 1.04 | 0.98 | 10.1 | 1010 | 6.9 | 2.7 | 1 | 21.5 × 3 | 0.411 | 0.170 |
| Example 9 | 2.00 | 1.25 | 74 | 919 | 1.10 | 0.96 | 10.0 | 960 | 10.6 | 6.8 | 1 | 22.3 × 4 | 0.412 | 0.165 |
| Example 10 | 1.51 | 1.39 | 70 | 919 | 1.11 | 0.98 | 10.9 | 1160 | 13.0 | 9.5 | 2 | 34.0 | 0.289 | 0.174 |
| Example 11 | 1.60 | 1.34 | 70 | 919 | 1.18 | 0.94 | 10.9 | 1110 | 12.5 | 8.6 | 2 | 27.0 | 0.235 | 0.176 |
| Comparative example 1 | 2.06 | 1.46 | 54 | 924 | | | 12.0 | 190 | | | | | | |
| Comparative example 2 | 1.95 | 1.12 | 18 | 922 | | | 22.0 | 1690 | | | | | | |
| Comparative example 3 | 1.39 | 1.40 | 70 | 919 | 1.02 | 0.99 | 11.3 | 1150 | 17.2 | 16.9 | 2 | 20.5 | 0.065 | 0.174 |
| Comparative example 4 | | | | | | | 10.0 | 960 | 16.2 | 14.0 | 1 | 20 | 0.103 | 0.165 |

Br-T: Brabender torque
Tensil: tensile impact strength
Granulation A: ampere during granulation
Extruding method 1: 40 mm φ single screw extruding machine is used.
Extruding method 2: 35 mm φ co-rotating twin screw extruding machine is used.

In Table 2, $MFRR_0$, granulation ampere$_0$, and specific energy$_0$ indicate, respectively, MFRR, current values during granulation, and specific energy for extruding for the ethylene copolymers obtained under the extruding conditions satisfying the above condition 5. $MFRR_1$, granulation amperes, and specific energy, indicate, respectively, MFRR, current values during granulation, and specific energy for extruding for the ethylene copolymers obtained under the extruding conditions satisfying the above condition 4 For determining whether the extruding conditions satisfy condition 4 or 5, the reference specific energy was obtained from the following (7):

$$W = 0.178 \times MFR^{-0.240} \quad (7)$$

Examples 1 to 11, which are the extruded ethylene copolymer resins obtained by the producing method of the present invention, can be molded into film shaving excellent melt tension, fluidity, and impact strength as well as excellent appearance (haze and transmittance). Particularly, films made of the ethylene copolymer have a low haze and LSI, indicating that their appearance is improved.

On the contrary, Comparative Example 1 using the high-pressure polyethylene, which is not the ethylene copolymer satisfying the above conditions 1 through 3 used in the present invention, has a low tensile impact strength, indicating that its impact strength is inadequate.

In addition, Comparative Example 2 using the metallocene-catalyzed linear low-density polyethylene, which is not the ethylene copolymer satisfying the above conditions 1 through 3 used in the present invention, has a high Brabender torque and a low melt tension, indicating that its melt tension and fluidity are inadequate.

Further, Comparative Example 3, using the extruded ethylene copolymer resin obtained by extruding the same ethylene copolymer as Examples 10 and 11 satisfying the above conditions 1 to 3 used in the present invention under extruding conditions not satisfying the above condition 4, has a high haze and LSI (transmittance), indicating that its appearance is inadequate.

In addition, Comparative Example 4, using the extruded ethylene copolymer obtained by extruding the same ethylene copolymer as Examples 1 and 9 satisfying the above conditions 1 through 3 used in the present invention under extruding conditions not satisfying the above condition 4, has a high haze and LSI (transmittance), indicating that its appearance is inadequate.

As described above, according to the producing method of the present invention, a extruded ethylene copolymer that can be molded into a film having excellent melt tension and fluidity as well as excellent impact strength and appearance (haze and transmittance), and a film and molded article that pre made of the extruded ethylene copolymer can be obtained.

What is claimed is:

1. An extruded ethylene copolymer obtained by a method comprising extruding an ethylene copolymer of ethylene and an α-olefin having 4 to 20 carbon atoms under conditions satisfying the following condition 4, and obtaining the extrudate, wherein an ethylene copolymer of ethylene and an α-olefin having 4 to 20 carbon atoms is an ethylene copolymer having a melt flow rate (MFR) and melt tension (MT) that satisfy the following conditions 1 to 3 when the ethylene copolymer is kneaded by using twin roll mill:

(a) Condition 1
the melt flow rate (MFR, unit: g/10 min.) is from 0.01 to 200;

(b) Condition 2
the melt flow rate (MFR) and melt tension (MT, unit: cN) at 190° C. satisfy the following (1):

$$2 \times MFR^{-0.59} < MT < 20 \times MFR^{-0.59};$$

(c) Condition 3
the melt flow rate (MFR) and intrinsic viscosity ([η], unit: dl/g) satisfy the following (2):

$$1.02 \times MFR^{-0.094} < [\eta] < 1.50 \times MFR^{-0.156}; \text{ and}$$

(d) Condition 4
the melt flow rate (MFR) of the copolymer and specific energy for extruding ethylene copolymer(W, unit: kw·hr/kg) satisfy the following (3):

$$W \geq 0.178 \times MFR^{-0.240}.$$

2. An extruded ethylene copolymer according to claim 1, wherein $MFR_1/MFR_0 > 1$ and $SR_1/SR_0 < 1$ are satisfied, in which $MFR_1$ and $SR_1$ are a melt flow rate and a swell ratio of said extruded ethylene copolymer, respectively, and $MFR_0$ and $SR_0$ are a melt flow ratio and swell ratio of an extruded copolymer by extruding the ethylene copolymer under conditions satisfying the following conditions:

(e) Condition 5
the melt flow rate (MFR) of the ethylene copolymer and specific energy for extruding the ethylene copolymer (W, unit: kw·hr/kg) satisfy the following (4):

$$W < 0.178 \times MFR^{-0.240}.$$

3. The extruded ethylene copolymer of ethylene and an α-olefin having 4 to 20 carbon atoms obtained under conditions satisfying the following condition 4, wherein said extruded ethylene copolymer has a melt flow rate (MFR) and melt tension (MT) that satisfy the following conditions 1 to 3 when said ethylene copolymer is kneaded by using a twin roll mill (a) Condition 1
the melt flow rate (MFR, unit: g/10 min.) is from 0.01 to 200;

(b) Condition 2
the melt flow rate (MFR) and melt tension (MT, unit: cN) at 190° C. satisfy the following (1):

$$2 \times MFR^{-0.59} < MT < 20 \times MFR^{-0.59};$$

(c) Condition 3
the melt flow rate (MFR) and intrinsic viscosity ([η], unit: dl/g) satisfy the following (2):

$$1.02 \times MFR^{-0.094} < [\eta] < 1.50 \times MFR^{-0.156}; \text{ and}$$

(d) Condition 4
the melt flow rate (MFR) of the copolymer and specific energy for extruding ethylene copolymer (W, unit: kw·hr/kg) satisfy the following (3):

$$W \geq 0.178 \times MFR^{-0.240}; \text{ and}$$

wherein $MFR_1/MFR_0 > 1$ and $SR_1/SR_0 < 1$ are satisfied, in which $MFR_1$ and $SR_1$ are a melt flow rate and a swell ratio of said extruded ethylene copolymer respectively, and $MFR_0$ and $SR_0$ are a melt flow rate and a swell ratio of an extruded copolymer by extruding the ethylene copolymer under conditions satisfying the following condition 5:

(e) Condition 5:
the melt flow rate (MFR) of the ethylene copolymer and specific energy for extruding the ethylene copolymer (W, unit: kw·hr/kg) satisfy the following (4):

$$W < 0.178 \times MFR^{-0.240}.$$

4. A molded article comprising the extruded ethylene copolymer according to claim 3.

5. The molded article according to claim 4, wherein the molded article is a film.

6. A method for producing a extruded ethylene copolymer, comprising extruding an ethylene copolymer of ethylene and an α-olefin having 4 to 20 carbon atoms under conditions satisfying the following condition 4, and obtaining the extrudate, wherein an ethylene copolymer of ethylene and an α-olefin having 4 to 20 carbon atoms is an ethylene copolymer of which melt flow rate (MFR) and melt tension (MT) satisfy the following conditions 1 to 3 when the ethylene copolymer is kneaded by using twin roll mill:

Condition 1
the melt flow rate (MFR, unit: g/10 min.) is from 0.01 to 200;

Condition 2
the melt flow rate (MFR) and melt tension (MT, unit: cN) at 190° C. satisfy the following (1):

$$2 \times MFR^{-0.59} < MT < 20 \times MFR^{-0.59}; \quad (1)$$

Condition 3
the melt flow rate (MFR) and intrinsic viscosity ([η], unit: dl/g) satisfy the following (2):

$$1.02 \times MFR^{-0.094} < [\eta] < 1.50 \times MFR^{-0.156}; \text{ and} \quad (2)$$

Condition 4
the melt flow rate (MFR) of the copolymer and specific energy for extruding ethylene copolymer (W, unit: kw·hr/kg) satisfy the following (3):

$$W \geq 0.178 \times MFR^{-0.240} \quad (3).$$

* * * * *